US008077486B2

(12) United States Patent
Djenguerian et al.

(10) Patent No.: US 8,077,486 B2
(45) Date of Patent: Dec. 13, 2011

(54) METHOD AND APPARATUS FOR POWER CONVERTER FAULT CONDITION DETECTION

(75) Inventors: Alex B. Djenguerian, Saratoga, CA (US); Erdem Bircan, San Carlos, CA (US)

(73) Assignee: Power Integrations, Inc., San Jose, CA (US)

( * ) Notice: Subject to any disclaimer, the term of this patent is extended or adjusted under 35 U.S.C. 154(b) by 248 days.

(21) Appl. No.: 12/058,533

(22) Filed: Mar. 28, 2008

(65) Prior Publication Data
US 2008/0247199 A1   Oct. 9, 2008

Related U.S. Application Data

(60) Provisional application No. 60/922,125, filed on Apr. 6, 2007.

(51) Int. Cl.
*H02M 3/335* (2006.01)
(52) U.S. Cl. .................. 363/21.12; 363/21.13
(58) Field of Classification Search ............... 363/21.12, 363/21.13, 21.15, 21.16, 21.17, 21.18, 21.04, 363/21.07
See application file for complete search history.

(56) References Cited

U.S. PATENT DOCUMENTS

| | | | |
|---|---|---|---|
| 4,849,869 A * | 7/1989 | Tanuma et al. ............ | 363/21.13 |
| 5,424,933 A | 6/1995 | Illingworth | |
| 6,115,266 A * | 9/2000 | Matsui et al. ............... | 363/21.13 |
| 6,147,883 A | 11/2000 | Balakrishnan et al. | |
| 6,233,161 B1 | 5/2001 | Balakrishnan et al. | |
| 6,480,399 B2 | 11/2002 | Balakrishnan et al. | |
| 6,580,593 B2 | 6/2003 | Balakrishnan | |
| 6,842,353 B2 | 1/2005 | Yamada et al. | |
| 6,900,995 B2 | 5/2005 | Muegge et al. | |
| 7,099,128 B2 * | 8/2006 | Balakrishnan et al. ......... | 361/18 |
| 7,259,972 B2 | 8/2007 | Yang | |
| 7,310,247 B1 | 12/2007 | Lin et al. | |
| 7,352,595 B2 | 4/2008 | Yang et al. | |
| 7,463,497 B2 * | 12/2008 | Negrete ..................... | 363/21.13 |
| 7,471,531 B2 * | 12/2008 | Blaha et al. ..................... | 363/97 |
| 7,486,528 B2 | 2/2009 | Yang | |
| 7,502,236 B2 * | 3/2009 | Baurle et al. ............... | 363/21.16 |
| 7,511,978 B2 * | 3/2009 | Chen et al. ..................... | 363/97 |
| 7,539,028 B2 | 5/2009 | Baurle et al. | |

(Continued)

OTHER PUBLICATIONS

Bindra, A., "Power Supply Controller Keeps Efficiency High Across All Loads: Using digital regulation, this power controller yields high performance at low loads with unconditional stability," Analog, Power Devices & DSP, Electronic Design, Dec. 3, 2001, pp. 50-52.

(Continued)

*Primary Examiner* — Adolf Berhane
*Assistant Examiner* — Jeffrey Gblende
(74) *Attorney, Agent, or Firm* — Blakely Sokoloff Taylor & Zafman LLP (57) ABSTRACT

An example controller includes a fault detector and a control. The fault detector is to be coupled to a feedback circuit of a power converter to detect a fault condition in the power converter in response to an input voltage of the power converter. The control is coupled to the fault detector and is to be coupled to control the switching of a power switch to regulate an output of the power converter. The control is coupled to inhibit the switching of the power switch in response to the fault detector detecting the fault condition during the switching of the power switch.

9 Claims, 8 Drawing Sheets

U.S. PATENT DOCUMENTS

| | | | |
|---|---|---|---|
| 7,541,795 B1* | 6/2009 | Smith et al. | 323/285 |
| 7,551,462 B2 | 6/2009 | Uruno et al. | |
| 7,609,533 B2 | 10/2009 | Chuang et al. | |
| 7,643,322 B1 | 1/2010 | Varga et al. | |
| 7,760,518 B2 | 7/2010 | Baurle et al. | |
| 2003/0222633 A1* | 12/2003 | Hwang | 323/282 |
| 2004/0095694 A1* | 5/2004 | Balakrishnan et al. | 361/18 |
| 2004/0120171 A1 | 6/2004 | Choi et al. | |
| 2006/0040449 A1* | 2/2006 | Lotfi et al. | 438/303 |
| 2006/0158909 A1* | 7/2006 | Hawley | 363/21.12 |
| 2007/0008749 A1* | 1/2007 | Baurle et al. | 363/21.12 |
| 2007/0291807 A1* | 12/2007 | Uesaka | 372/38.04 |
| 2008/0012542 A1* | 1/2008 | Liu et al. | 323/271 |
| 2008/0192514 A1 | 8/2008 | Zhou et al. | |
| 2008/0247202 A1 | 10/2008 | Djenguerian et al. | |

OTHER PUBLICATIONS iWatt, "iW2201—Digital SMPS Controller: Preliminary Data," Revision 1.1, pp. 1-13.

iWatt, "iW2202—Digital SMPS Controller: Preliminary Data," Revision 1.0, pp. 1-14.

Texas Instruments, UCC28600, 8-Pin Quasi_Resonant Flyback Green-Mode Controller, 222.ti.com, SLUS646C, Nov. 2005, Revised Feb. 2007, pp. 1-25.

* cited by examiner

METHOD AND APPARATUS FOR POWER CONVERTER FAULT CONDITION DETECTION

REFERENCE TO PRIOR APPLICATION

This application claims the benefit of U.S. Provisional Application No. 60/922,125, filed Apr. 6, 2007, entitled "Method and Apparatus for Power Converter Fault Condition Detection."

This application is related to co-pending U.S. Non-Provisional application Ser. No. 12/058,530, filed Mar. 28, 2008, entitled "Method and Apparatus for Sensing Multiple Voltage Values From a Single Terminal of a Power Converter Controller."

BACKGROUND INFORMATION

1. Field of the Disclosure

The present invention relates generally to power converters, and more specifically, the invention relates to control circuits that regulate an output of a power converter.

2. Background

Many electrical devices such as cell phones, personal digital assistants (PDA's), laptops, etc. are powered by a source of relatively low-voltage DC power. Because power is generally delivered through a wall outlet as high-voltage AC power, a device, typically referred to as a power converter, is required to transform the high-voltage AC power to low-voltage DC power. The low-voltage DC power may be provided by the power converter directly to the device or it may be used to charge a rechargeable battery that, in turn, provides energy to the device, but which requires charging once stored energy is drained. Typically, the battery is charged with a battery charger that includes a power converter that meets constant current and constant voltage requirements required by the battery. In operation, a power converter may use a controller to regulate output power delivered to an electrical device, such as a battery, that may be generally referred to as a load. More specifically, the controller may be coupled to a sensor that provides feedback information of the output of the power converter in order to regulate power delivered to the load. The controller regulates power to the load by controlling a power switch to turn on and off in response to the feedback information from the sensor to transfer energy pulses to the output from a source of input power such as a power line.

Power converter control circuits may be used for a multitude of purposes and applications. There is a demand for control circuit functionality that can reduce the number of components outside the integrated control circuit. This reduction in external component count enables miniaturization of the power converter to improve portability, reduces the number of design cycles required to finalize a power converter design and also improves reliability of the end product. Furthermore, reduced component count can offer energy efficiency improvements in the operation of the power converter and can reduce the power converter cost. One aspect of the power converter offering the potential for component count reduction is in simplifying or removing the external circuitry previously required to detect fault conditions in the power converter.

In a power converter used for AC/DC power conversion, the output voltage is typically measured across the power supply output terminals to generate a feedback signal via a feedback circuit that is coupled to a control circuit on the input side of the power converter. Typically, the control circuit of the power converter regulates output power at the output terminals in response to the feedback signal. More specifically, the control circuit is responsive to the feedback signal to control switching of a power switch coupled to transfer energy from the input to the output of the power converter.

If the control circuit loses feedback information due to a fault, such as a short or open circuit in the feedback circuit, the power converter may deliver unregulated power which may cause damage to an electrical device coupled to the power converter or to the power converter itself.

BRIEF DESCRIPTION OF THE DRAWINGS

Non-limiting and non-exhaustive embodiments and examples of the present invention are described with reference to the following figures, wherein like reference numerals refer to like parts throughout the various views unless otherwise specified.

DETAILED DESCRIPTION

Methods and apparatuses for detecting a fault condition in a power supply are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

A circuit for detecting a fault condition in a power supply in accordance with the teachings of the present invention will now be described.

Figure 1A:
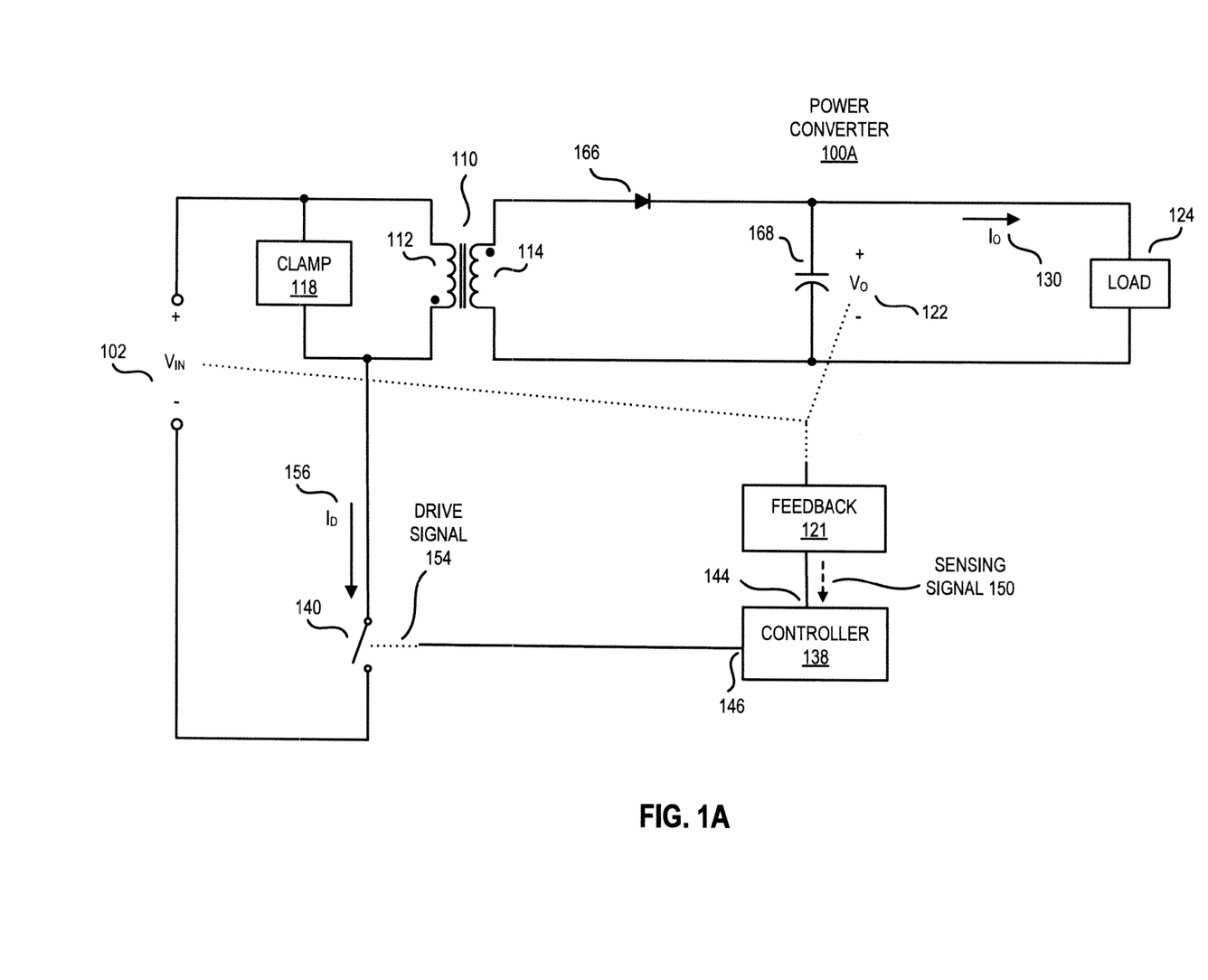
FIG. 1A is a functional block diagram illustrating one example of a switching power converter that uses a flyback topology and detects a fault condition in accordance with the teachings of the present invention.

FIG. 1A is a functional block diagram illustrating one example of a switching power converter 100A, also referred to herein as a power supply, that uses a flyback topology and detects a fault condition in accordance with the teachings of the present invention. The illustrated example of power converter 100A includes an energy transfer element 110, a clamp circuit 118, a feedback circuit 121, a controller 138, a power switch 140, a diode 166 and a capacitor 168.

Power converter 100A provides output power to a load 124 from an unregulated input voltage 102. Input voltage 102 is coupled to energy transfer element 110 and power switch 140. In the example of FIG. 1A, energy transfer element 110 is a transformer with an input winding 112 and an output winding 114. An "input winding" may also be referred to as a "primary winding" and an "output winding" may also be referred to as a "secondary winding." Clamp circuit 118 is coupled to input winding 112 of energy transfer element 110 to limit the maximum voltage on power switch 140. Power switch 140 may be closed, thereby allowing current to be conducted through the switch, and opened, thereby substantially terminating conduction through the switch, in response to controller 138. Thus, a switch that is closed may be referred to as being in an ON state, whereas a switch that is open may be referred to as being in an OFF state. In one example, power switch 140 is a transistor. In one example, controller 138 may be implemented as a monolithic integrated circuit or may be implemented with discrete electrical components or a combination of discrete and integrated circuits. During operation of the power converter, the switching of power switch 140 produces pulsating current in diode 166 that is filtered by capacitor 168 to produce a substantially constant output voltage 122 or output current 130 at load 124.

The output quantity to be regulated by controller 138 switching power switch 140 could be output voltage 122, output current 130, or a combination of the two. Feedback circuit 121 is coupled to output a sensing signal 150. In one example, sensing signal 150 is representative of input voltage 102 when power switch 140 is in the ON state. In one example, sensing signal 150 is representative of output voltage 122 when power switch 140 is in the OFF state.

As shown in the depicted example, controller 138 is coupled to sample sensing signal 150 that is generated by feedback circuit 121. A sampled sense signal is then used by controller 138 to determine whether a fault condition is present in feedback circuit 121.

In operation, controller 138 operates power switch 140 to substantially regulate an output quantity of power converter 100A. If a fault condition is detected in response to sensing signal 150 from feedback circuit 121, controller 138 reduces an output power level provided to load 124 by power converter 100A.

Figure 1B:
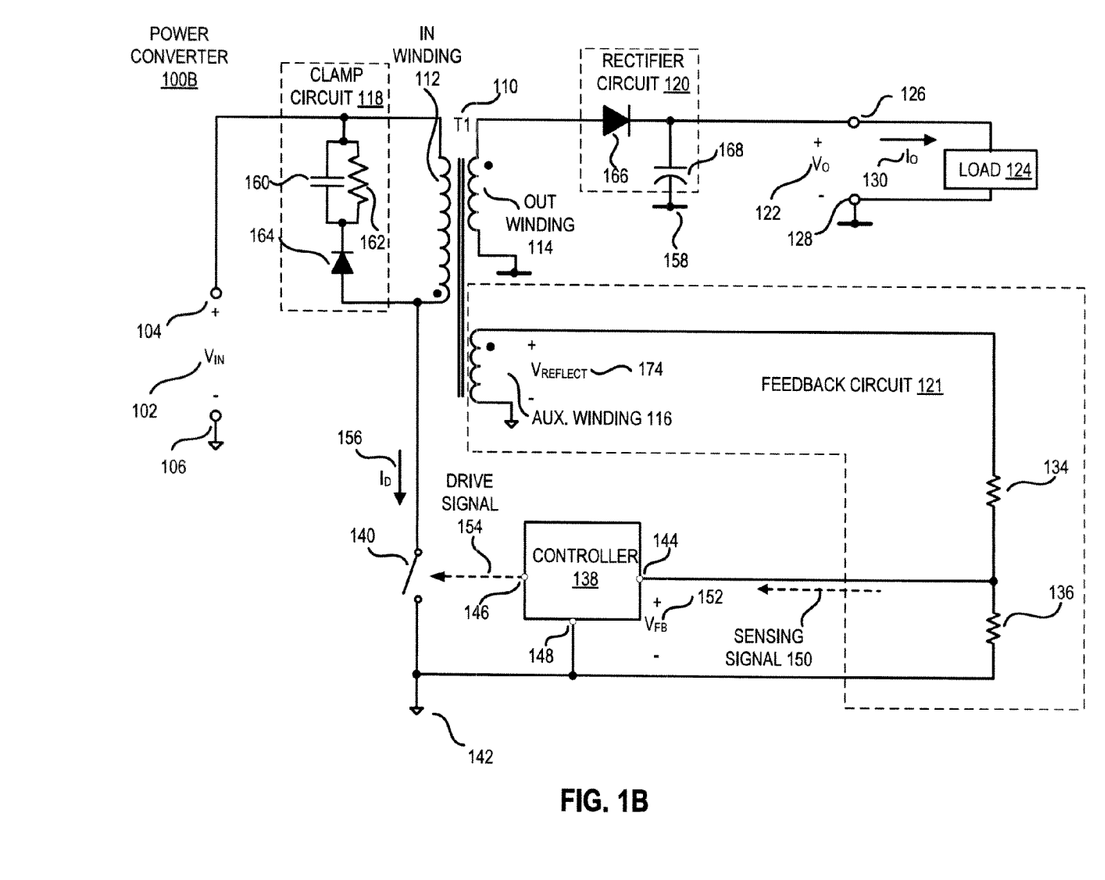
FIG. 1B is a schematic illustrating an example power converter employing a controller circuit that may detect a fault condition responsive to a sensing signal in accordance with the teachings of the present invention.

FIG. 1B is a schematic illustrating an example power converter 100B employing controller 138 that detects a fault condition responsive to sensing signal 150 in accordance with the teachings of the present invention. Power converter 100B represents one possible implementation of power converter 100A. The illustrated example of power converter 100B includes first and second input terminals 104 and 106, energy transfer element 110, clamp circuit 118, a rectifier circuit 120, feedback circuit 121, first and second output terminals 126 and 128, controller 138, power switch 140, an input return 142 and an output return 158. The illustrated example of energy transfer element 110 includes input winding 112, output winding 114, and an auxiliary winding 116. Clamp circuit 118 is illustrated as including a capacitor 160, a resistor 162, and a diode 164. Rectifier circuit 120 is illustrated as including diode 166 and capacitor 168. The illustrated example of feedback circuit 121 includes auxiliary winding 116 and resistors 134 and 136. Controller 138 is illustrated as including feedback terminal 144, output terminal 146, and a ground terminal 148.

In one example, power converter 100B is an isolated flyback converter where input return 142 and output return 158 are isolated from one another. In one example, energy transfer element 110 substantially prevents DC current from flowing from the input side to the output side of power converter 100B. In another example, energy transfer element 110 is a non-isolated converter with input return 142 and output return 158 coupled together. It is noted that in other examples power converter 100B could have more than one output in accordance with the teachings of the present invention.

As shown, controller 138 is coupled to power switch 140, which in one example is a metal oxide semiconductor field effect transistor (MOSFET) switch, a bipolar transistor or the like. Power switch 140 is coupled to input winding 112 of energy transfer element 110, which is coupled to input voltage 102. In the illustrated example, clamp circuit 118 is coupled across input winding 112 to limit the maximum voltage across power switch 140. In one example, controller 138 and power switch 140 could form part of an integrated circuit that is manufactured as a hybrid or monolithic integrated circuit.

In the illustrated example, controller 138 is coupled to regulate energy delivered from the first and second input terminals 104 and 106 of power converter 100B to the power converter output terminals 126 and 128 coupled to load 124. In one example, the specific output parameter being regulated is DC output voltage 122. Sensing signal 150 is coupled to controller 138 from auxiliary winding 116 through the resistor divider formed by resistors 134 and 136. In one example, values for resistors 134 and 136 are chosen or adjusted based on a desired output voltage 122.

In operation, controller 138 regulates the output of power supply 100 by switching power switch 140 in response to sensing signal 150. When power switch 140 is in the ON state, energy from input terminals 104 and 106 is transferred into input winding 112 of energy transfer element 110. When power switch 140 is in the OFF state, the energy stored in input winding 112 is transferred to output winding 114. The energy from output winding 112 is transferred to the output of the power supply 100B with output current 130 that flows through forward biased power diode 166 to output capacitor 168 and load 124. While output current 130 flows through power diode 166 during the OFF state of power switch 140, output voltage 122 is substantially equal to a voltage across output winding 114. In operation, controller 138 produces pulsating currents in rectifier circuit 120 which, in the illustrated example, includes diode 166 filtered by capacitor 168 to produce the substantially constant output voltage 122.

As shown in FIG. 1B, controller 138 is coupled to receive sensing signal 150, which in one example is a voltage signal, but in another example could be a current signal or other signal indicative of the power supply input and/or output while still benefiting from the teachings of the present invention. As shown in FIG. 1B, auxiliary winding 116 provides a reflected voltage 174, which may be representative of output voltage 122 when power switch 140 is in the OFF state. Reflected voltage 174 may also be representative of input voltage 102 when power switch 140 is in the ON state. In one example, sensing signal 150 is representative of reflected voltage 174 and is received by controller 138 via feedback terminal 144. As with reflected voltage 174, described above, sensing signal 150 can be representative of input voltage 102 when power switch 140 is in the ON state and representative of output voltage 122 when power switch 140 is in the OFF state.

In one example, reflected voltage 174 and/or sensing signal 150 are representative of output voltage 122 for only a portion of the time power switch 140 is in the OFF state and are representative of input voltage 102 for only a portion of the time power switch 140 is in the ON state.

When power switch 140 is in the ON state a drain current 156 flows through input winding 112 allowing reflected voltage 174 to represent a voltage that is proportional to input voltage 102. Reflected voltage 174 may be proportional to input voltage 102 by a proportion of a number of turns in auxiliary winding 116 to a number of turns in input winding 112. An example relationship that exists between the turns ratio and voltage ratio is shown below:

$$\frac{V_{REFLECT}}{V_{IN}} = \frac{N_A}{N_I} \qquad (1)$$

where $N_A$ is the number of turns on auxiliary winding 136 and $N_I$ is the number of turns on input winding 112.

When power switch 140 transitions from the ON state to the OFF state, drain current 156 is substantially prevented from flowing through power switch 140 and the energy stored in input winding 112 is transferred to output winding 114 allowing reflected voltage 174 to represent a voltage that is proportional to output voltage 122. Reflected voltage 174 may be proportional to the output voltage 122 by a proportion of a number of turns in auxiliary winding 116 to the number of turns in output winding 114. An example relationship that may exist between the turns ratio and the voltage ratio is shown below:

$$\frac{V_{REFLECT}}{V_{OUT} + V_F} = \frac{N_A}{N_O} \qquad (2)$$

where $N_A$ is the number of turns on auxiliary winding 116, $N_O$ is the number of turns on output winding 114 and $V_F$ is the voltage across diode 166 when diode 166 is forward biased. In one example, $V_F$ is negligible with respect to $V_{OUT}$, where equation 2 may be simplified to:

$$\frac{V_{REFLECT}}{V_{OUT}} \approx \frac{N_A}{N_O} \qquad (3)$$

In one example, if feedback circuit 121 is decoupled from feedback terminal 144 or shorted to input return 142, controller 138 will recognize a fault condition and inhibit switching of power switch 140 for an amount of time to limit power at output terminals 126 and 128. If sensing signal 150 is prevented from reaching feedback terminal 144, controller 138 senses input voltage 102 as substantially zero volts when power switch 140 is in the ON state and senses output voltage 122 as substantially zero volts when power switch 140 is in the OFF state. In one example, controller 138 recognizes a fault condition when sensing signal 150, representing input voltage 102, is under a line voltage threshold. In another example, controller 138 recognizes a fault condition when sensing signal 150, representing output voltage 122, is under an output voltage threshold.

In one example, if resistor 134 is uncoupled from auxiliary winding 116 or feedback terminal 144, controller 138 detects a fault condition. In another example, if resistor 136 is shorted to input return 142, controller 138 will also detect a fault condition. For the reasons explained in the example above, if a fault condition is detected controller 138 inhibits switching of power switch 140 for an amount of time to limit the power supplied to output terminals 126 and 128.

Figure 2:
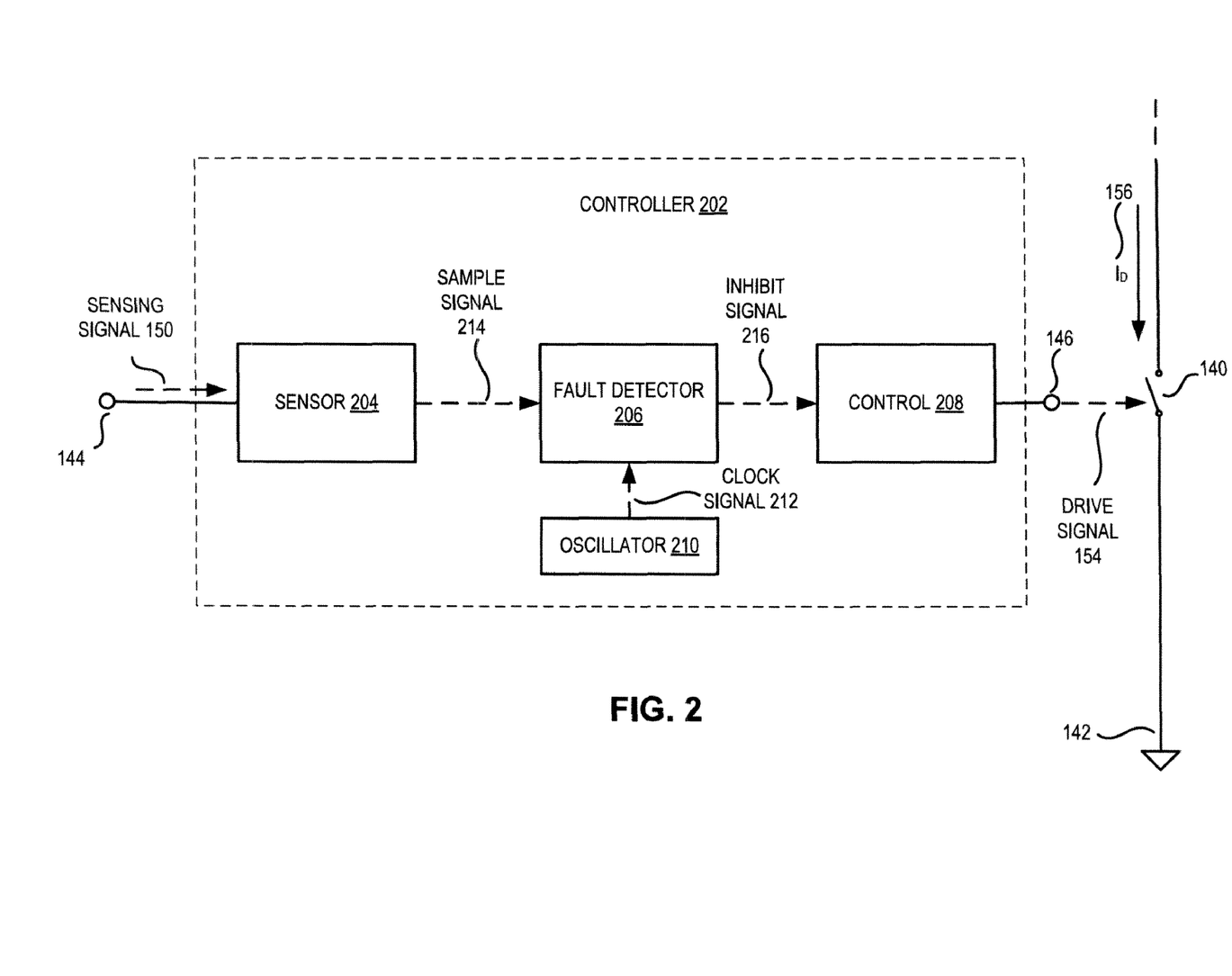
FIG. 2 is a functional block diagram illustrating an example controller circuit in accordance with the teachings of the present invention.

FIG. 2 is a functional block diagram illustrating an example controller 202 in accordance with the teachings of the present invention. Controller 202 represents one possible implementation of controller 138, shown in FIGS. 1A and 1B. The illustrated example of controller 202 includes a sensor 204, a fault detector 206, a control 208 and an oscillator 210.

In the illustrated example, sensor 204 is coupled to receive sensing signal 150 via feedback terminal 144. In operation, sensor 204 samples sensing signal 150 and outputs sample signal 214. Sample signal 214 may be in the form of a current or a voltage. In one example, sensor 204 samples sensing signal 150 during the ON state of power switch 140 and outputs sample signal 214, which, in this example, is representative of input voltage 102. In another example, sensor 204 samples sensing signal 150 during the OFF state of power switch 140 and outputs sample signal 214, which, in this example, is representative of output voltage 122.

In the example of FIG. 2, fault detector 206 is coupled to receive sample signal 214. In operation, fault detector 206 compares sample signal 214 with a fault threshold. In one example, the fault threshold is a current threshold value when sample signal 214 is a current and a voltage threshold value when sample signal 214 is a voltage. The fault threshold may include an input fault threshold if sample signal 214 is representative of input voltage 102 and may include an output fault threshold if sample signal 214 is representative of output voltage 122. In one example, if sample signal 214 is below the fault threshold for a period of time, fault detector 206 outputs inhibit signal 216, which indicates the presence of a fault condition in the power converter. In this example the period of time for determining whether a fault condition is present may be determined responsive to clock signal 212 generated by oscillator 210.

The illustrated example of controller 202 includes control 208 coupled to receive inhibit signal 216. In one example, control 208 outputs drive signal 154 via output terminal 146 to alternate power switch 140 between the ON and OFF states. In one example, control 208 is coupled to receive other feedback information (not shown) in order to control the transfer of energy from a input winding to an output winding to regulate output of a power converter. In this example, the regulated output may include output voltage 122, output current 130, or a combination of both. Control 208 may employ various techniques to control the switching of power switch 140, including, but not limited to, ON/OFF control, pulse width modulation (PWM), or the like.

In accordance with the teachings of the present invention, control 208 inhibits the switching of power switch 140 in response to receiving inhibit signal 216 that indicates the presence of a fault condition. In response to the presence of a fault condition, control 208 inhibits the switching of power switch 140 to reduce a power level output by the power converter. In one example, control 208 inhibits switching by disabling power switch 140 (e.g., keeps power switch 140 in the OFF state). In one example, control 208 inhibits switching by adjusting a frequency or duty cycle of drive signal 154. In one example, control 208 inhibits switching by limiting drain current 156 while power switch 140 is in the ON state. In still another example, control 208 repeats a fault cycle while the fault condition is present. The fault cycle may include a number of switching cycles of power switch 140 followed by a number of skipped switching cycles.

Figure 3A:
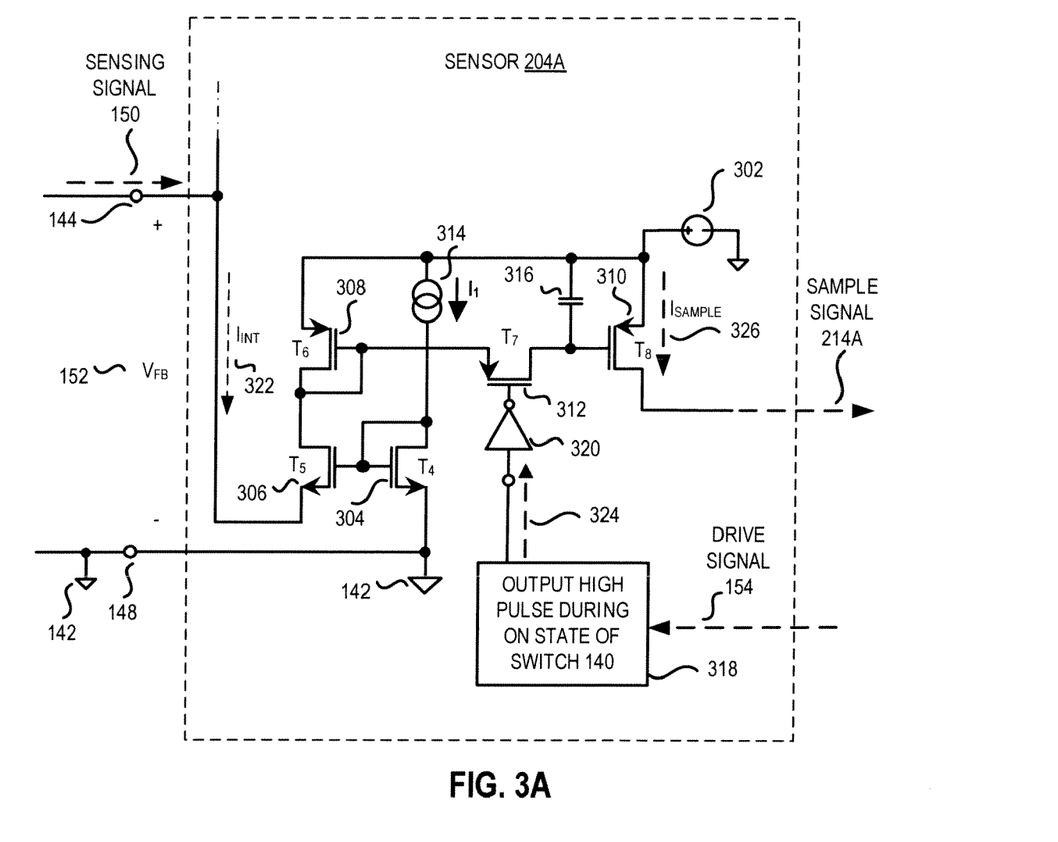
FIG. 3A is a schematic illustrating an example sensor that outputs a sample signal that is representative of the input voltage of a power converter in accordance with the teachings of the present invention.

FIG. 3A is a schematic illustrating an example sensor 204A that outputs a sample signal 214A that is representative of input voltage 102 of a power converter in accordance with the teachings of the present invention. Sensor 204A represents one possible implementation of sensor 204, shown in FIG. 2, to sample sensing signal 150 during the ON state of power switch 140. The illustrated example of sensor 204A includes an internal voltage supply 302, n-channel transistors 304 and 306, p-channel transistors 308 and 310, and 312, a current source 314, a capacitor 316, a sample command block 318, and an inverter 320.

N-channel and p-channel transistors perform complementary or opposite functions, such that a signal that causes an n-channel transistor to turn on will cause a p-channel transistor to turn off. For analog signals, a signal that causes an n-channel transistor to conduct more current will cause a p-channel transistor to conduct less current. An n-channel transistor requires a positive voltage between the gate and source for the transistor to conduct current. A p-channel transistor requires a negative voltage between the gate and source to for the transistor to conduct current. An n-channel transistor substantially prevents current flow through the n-channel transistor when the positive voltage between the gate and source of the n-channel transistor is less than the transistor's threshold voltage. As the voltage between the gate and source of the n-channel transistor becomes greater than the transistor's threshold voltage, more current is permitted to flow through the n-channel transistor. Conversely, the p-channel transistor substantially prevents current flow through the p-channel transistor when the negative voltage between the gate and source of the p-channel transistor is less negative (closer to zero) than the transistor's negative threshold voltage. As the negative voltage between the gate and source of the p-channel transistor become more negative than the transistor's negative threshold voltage, more current is permitted to flow through the p-channel transistor.

In the illustrated example, internal voltage supply 302 is coupled to current source 314 that supplies current $I_1$ to transistor 304. A gate of transistor 304 is coupled to a gate of transistor 306. Transistor 308 is coupled between internal voltage supply 302 and transistor 306. In operation, sensor 204A samples sensing signal 150 when power switch 140 is in the ON state. More specifically, feedback terminal 144 is clamped to substantially zero volts with respect to common reference 142 due to internal current 322 which flows through feedback terminal 144. In one example, internal current 332 is a negative current because reflected voltage 174 is negative when power switch 140 is in the ON state. In one example, internal current 322 varies in response to the magnitude of reflected voltage 174, which is representative of input voltage 102.

As shown in FIG. 3A, internal current 322 flows through transistor 306 and 308. In one example, internal current 322 may be reflected voltage 174 divided by the resistance of resistor 134 shown in FIG. 1B. As shown in the depicted example of FIG. 3A, transistor 312 is coupled between the gate of transistor 308 and the gate of transistor 310. An output of inverter 320 is coupled to the gate of transistor 312. Inverter 320 is coupled to receive a signal 324.

As shown in the illustrated example, sample command block 318 is coupled to inverter 320 such that transistor 312 is in an on state only when power switch 140 is in the ON state. In one example, signal 324 goes high for a short time after power switch 140 transitions from the OFF state to the ON state. In one example, signal 324 may be derived from drive signal 154.

As shown, capacitor 316 is coupled between internal voltage supply 302 and the gate of transistor 310. When signal 324 is high, transistor 312 allows current to flow to and from capacitor 316 to adjust the voltage at the gate of transistor 310 to match the voltage at the gate of transistor 308. When signal 324 is low, transistor 312 is off and substantially prevents current flow to and from capacitor 316. Since the voltage at the gate of transistor 308 is substantially equal to the voltage at the gate of transistor 310, a sample current 326 proportional to internal current 322 will flow through transistor 310. In one example, the proportionality of internal current 322 to sample current 326 is based on the proportionality of the sizing of transistor 308 to transistor 310. According to the depicted example, sample current 326 is representative of reflected voltage 174. In one example, sample current 326 is represented by the sample signal 214A as a current. In another example, the sample signal 214A may be converted to a voltage that represents sample current 326.

Figure 3B:
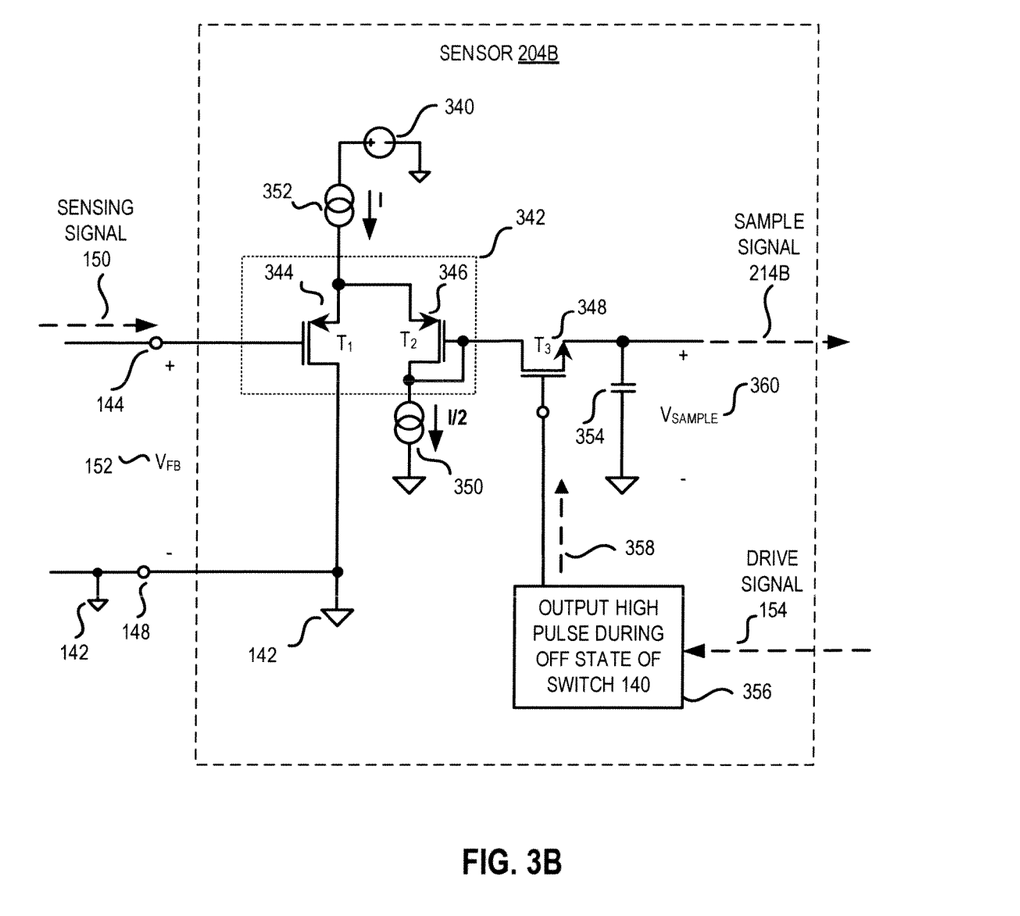
FIG. 3B is a schematic illustrating an example sensor that outputs a sample signal that is representative of the output voltage of a power converter in accordance with the teachings of the present invention.

FIG. 3B is a schematic illustrating an example sensor 204B that outputs a sample signal 214B that is representative of the output voltage 122 of a power converter in accordance with the teachings of the present invention. Sensor 204B represents one possible implementation of sensor 204, shown in FIG. 2, to sample sensing signal 150 during the OFF state of power switch 140. The illustrated example of sensor 204B includes an internal voltage supply 340, a current mirror 342, an n-channel transistor 348, current sources 350 and 352, a capacitor 354, and a sample command block 356. Current mirror 342 is illustrated as including p-channel transistors 344 and 346.

In the illustrated example, internal voltage supply 340 is coupled to a current source 352 that supplies current to current mirror 342. In one example, transistors 344 and 346 are matched transistors. In this example, current source 350 is coupled to sink current from transistor 346. A gate of transistor 344 is coupled to receive sensing signal 150 via feedback terminal 144. In this example, sensing signal 150 includes feedback voltage 152, which may be dropped across resistor 136 shown in FIG. 1B. As is depicted in FIG. 3B, transistor 348 is coupled between a gate of transistor 346 and capacitor 354. A gate of transistor 348 is coupled to receive a signal 358 generated by sample command block 356.

In operation, the voltage at the gate of transistor 344 is equal to feedback voltage 152. The voltage at the gate of transistor 346 with respect to input return 142 is substantially equal to feedback voltage 152. In one example, sample signal 214B is representative of output voltage 122. As shown, capacitor 354 is coupled to transistor 348 such that when a signal 358 is high, transistor 348 allows current to flow to and from capacitor 354 to adjust the voltage of sampled signal 214B to match feedback voltage 152.

As shown in the illustrated example, sample command block 356 is coupled to transistor 348 such that transistor 348 is in an on state only when power switch 140 is in the OFF state. In one example, signal 358 goes high for a short time after power switch 140 transitions from the ON state to the OFF state. When signal 358 is low, switch 348 substantially prevents current flow to and from capacitor 354. In one example, signal 358 is derived from drive signal 154. In another example, signal 358 is derived from sensing signal 150.

In one example, sample command block 356 is coupled to determine a sampling period of the OFF state of power switch 140. In one example, sample command block 356 determines the sampling period by comparing sensing signal 150 with a threshold voltage level to generate signal 358 as a logic high when sensing signal 150 is greater than the threshold voltage level. In one example, the duration for which transistor 348 is driven by sample command block 356 with the logic high of signal 358 is substantially equal to a time period to allow capacitor 354 to charge. In one example, transistor 348 is driven by a logic high of signal 358 for only a portion of the time that output current 130 flows through diode 166.

Referring now back to FIG. 2, sensor 204 may include sensor 204A to sample sensing signal 150 only during the ON state of power switch 140 to output sample signal 214 that is representative of the input voltage of a power converter. In another example, sensor 204 includes sensor 204B to sample sensing signal 150 only during the OFF state of power switch 140 to output sample signal 214 that is representative of the output voltage of a power converter. In yet another example, sensor 204 includes both sensors 204A and 204B to sample sensing signal 150 during the ON and OFF states, respectively. In this example, sensor 204 outputs sensing signal 214 that is representative of the input voltage during the ON state of power switch 140 and of the output voltage during the OFF state.

Figure 4A:
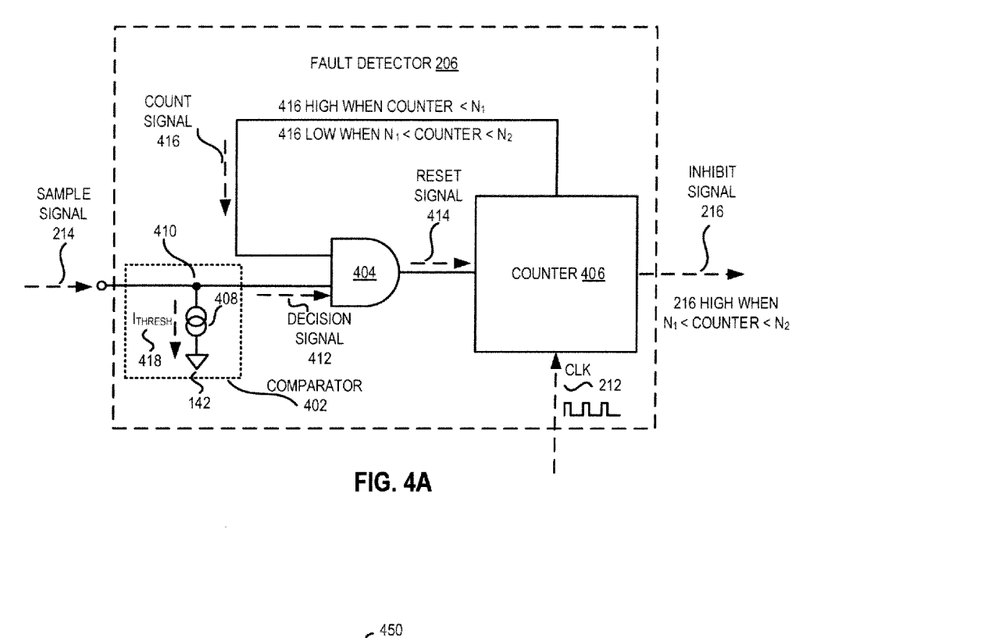
FIG. 4A is a functional block diagram illustrating an example fault detector that outputs an inhibit signal that indicates the presence of a fault condition of a power converter in accordance with the teachings of the present invention.

FIG. 4A is a functional block diagram illustrating an example fault detector 206 that outputs an inhibit signal 216 that indicates the presence of a fault condition of a power converter in accordance with the teachings of the present invention. The illustrated example of fault detector 206 includes a comparator 402, an AND gate 404, and a counter 406. In one example comparator 402 is a current comparator that receives sample signal 214 as a current; although in other examples comparator 402 may be a voltage comparator that receives sample signal 214 as a voltage. In the illustrated example, comparator 402 is a current comparator that includes a node 410 and a current source 408 that produces a threshold current $I_{THRESH}$ 418. In another example, comparator 402 is a voltage comparator that includes a voltage source that produces a voltage threshold.

In the illustrated example, comparator 402 is coupled to receive sample signal 214. In one example, sample signal 214 includes sample signal 214A generated by sensor 204A and is representative of input voltage 102. In one example, sample signal 214 includes sample signal 214B generated by sensor 204B and is representative of output voltage 122. Comparator 402, whether implemented as a voltage comparator or a current comparator, is also coupled to output a decision signal 412 to an input terminal of AND gate 404.

In operation, comparator 402 receives sample signal 214 and compares it with a fault threshold to determine the logic state of decision signal 412. In one example, comparator 402 includes a current source 408 that draws a threshold current 418, although in other examples comparator 402 may include a voltage source to generate a threshold voltage. In the depicted example, sample signal 214 is representative of a sample current (e.g., sample current 326 of FIG. 3A). In this example, when a sample signal 214 is greater than threshold current 418, no fault condition is detected. When no fault condition is detected, decision signal 412 is set to a logic high due to a rise in a voltage potential between node 410 and input return 142. Conversely, when sample signal 214 is less than threshold current 418 a fault condition is detected. When a fault condition is detected, decision signal 412 is set to a logic low due to a substantially zero or low voltage potential between node 410 and input return 142. In operation, comparator 402 sets decision signal 412 to a logic low to represent that a fault condition is detected in feedback circuit 121 and to a logic high to represent that no fault condition is detected.

In the illustrated example, fault detector 206 is shown as detecting a fault condition when sample signal 214 falls below a fault threshold (e.g., $I_{THRESH}$ 418). In one example, $I_{THRESH}$ 418 is set to detect a fault condition in feedback circuit 121. A fault in feedback circuit 121 may be detected as a substantially open circuit or substantially short circuit condition at feedback terminal 144. In this example, $I_{THRESH}$ 418 is set such that comparator 402 outputs decision signal 412 as a logic low when feedback voltage 152, represented by sample signal 214, is substantially zero volts.

Although the illustrated example of fault detector 206 is described in connection with detecting faults in feedback circuit 121, it is recognized that in other examples, $I_{THRESH}$ 418 may be set to detect various other fault conditions in the power converter. For example, $I_{THRESH}$ 418 may be set to an input line voltage threshold to detect a drop in input voltage 102. In another example, $I_{THRESH}$ 418 is set to an output voltage threshold to detect a drop in output voltage 122.

As shown in the depicted example, AND gate 404 outputs a reset signal 414 that is set in response to both decision signal 412 and a count signal 416. In operation, reset signal 414 is only high when decision signal 412 and count signal 416 are both high. In the depicted example, counter 406 is a free running repeating counter. When reset signal 414 is high, counter 406 resets its count to zero. When reset signal 414 is low, counter 416 increments the count responsive to clock signal 212. Thus, if no fault condition is detected by comparator 402, counter 406 continually resets the count until such time as a fault condition is detected, as indicted by decision signal 412 changing to a logic low.

In one example, counter 416 includes a first number threshold N1 that represents a period of time that the fault condition must be present before counter 406 outputs a logic high inhibit signal 216. First number threshold N1 prevents momentary fault conditions from causing control 208 to inhibit the switching of power switch 140. In this example, counter 406 keeps inhibit signal 216 at a logic low until the count reaches the first number threshold N1. If the fault condition is removed or is no longer present before the first number threshold N1 is reached, the count of counter 406 is reset to zero and inhibit signal 216 is kept at a logic low.

In one example, counter 416 includes a second number threshold N2 that represents a period of time that control 208 is to inhibit the switching of power switch 140. In this example, after counter 406 reaches the first number threshold, inhibit signal 216 is transitioned from a logic low to a logic high, resulting in control 208 inhibiting the switching of power switch 140. At this point, counter 406 continues counting until the second number threshold N2 is reached. When the count is between the first and second number thresholds, counter 406 outputs a logic low count signal 416 to AND gate 404. Thus, in this example, inhibit signal 216 will remain high until the second number threshold is reached, regardless of whether the fault condition remains. This prevents momentary absences of the fault condition from resetting the counter and thus allows control 208 to reduce an output power level of the power converter.

In operation, count signal 416 is always set to a logic high until counter 406 exceeds the first threshold number N1 and then transitions to a logic low which results in a logic low reset signal 414. Counter 406 keeps count signal 416 at a logic low for the time it takes counter 406 to increment from the first threshold number N1 to the second threshold number N2. Counter 406 also sets inhibit signal 216 to a logic high when counter 406 is between the first threshold number N1 and the second threshold number N2. In one example, counter 406 automatically resets the count after reaching the second threshold number N2.

Figure 4B:
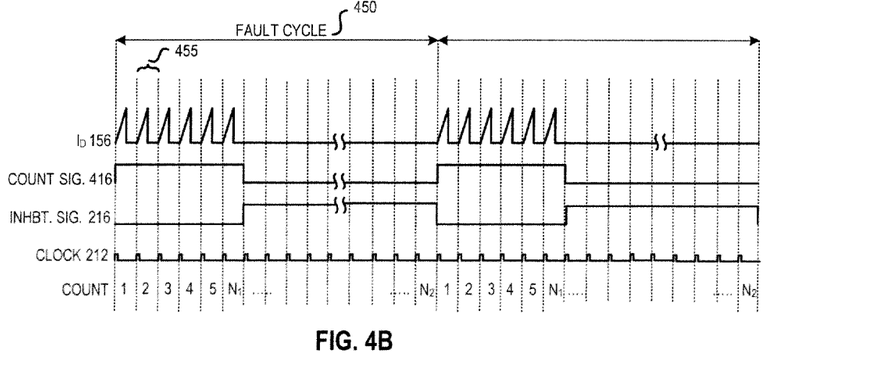
FIG. 4B shows waveforms for a fault detector that outputs an inhibit signal that indicates the presence of a fault condition of a power converter in accordance with the teachings of the present invention.

FIG. 4B shows waveforms for a fault detector that outputs inhibit signal 216 that indicates the presence of a fault condition of a power converter in accordance with the teachings of the present invention. The illustrated waveforms of FIG. 4B represent waveforms of one possible implementation of fault detector 206, shown in FIG. 4A.

In the illustrated example, controller 138 operates in a repeating fault cycle 450 to limit an amount of power delivered at output terminals 126 and 128. In this example, a fault condition is detected, for example, by controller 138 failing to receive sensing signal 150 from feedback circuit 121. In this example, repeating fault cycle 450 allows counter 406 to reset if the fault condition is removed up until counter 406 reaches the first threshold number N1. Once the first threshold number N1 is reached counter 406 outputs a logic high inhibit signal 216, which is kept high until counter 406 reaches the second threshold number. In the depicted example, counter 406 increments during each switching cycle 455 of power switch 140. In one example counter 406 increments in response to clock signal 212, generated by oscillator 210. In other examples, counter 406 may increment in response to any other timing signal associated with controller 138.

The various logic levels disclosed throughout this disclosure are intended to be illustrative and not limiting. For example, although FIG. 4A illustrates particular logic levels as indicating information of fault detector 206, it is appreciated that known logic elements may be added, removed, or replaced to alter a particular logic level disclosed. For instance, AND gate 404 may be replaced with a NAND gate, where a logic low rather than a logic high of reset signal 414 triggers a reset of counter 406.

Figure 5:
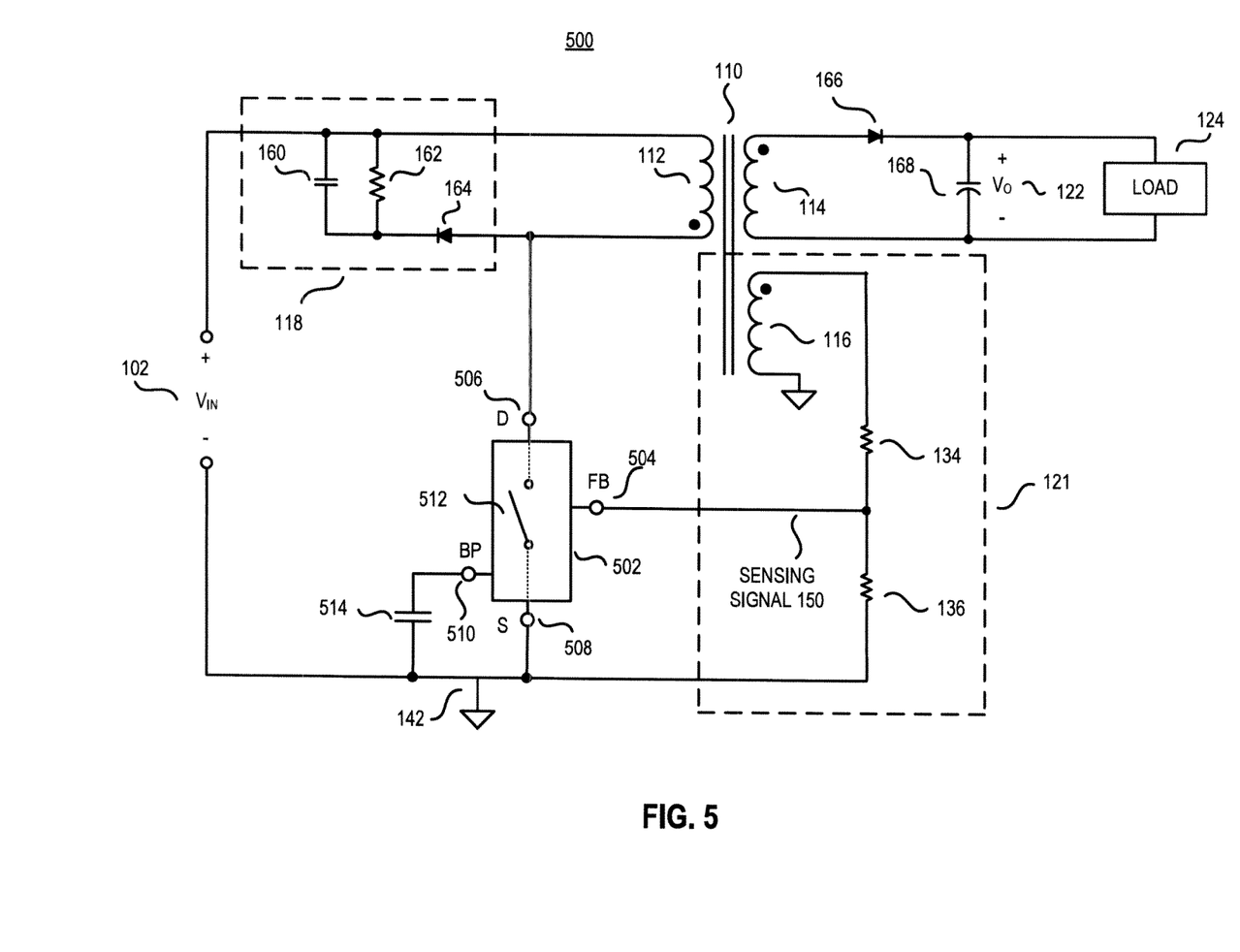
FIG. 5 illustrates an example power converter that includes an example integrated controller circuit for detecting a fault condition in accordance with the teachings of the present invention.

FIG. 5 illustrates an example power converter 500 that includes an example integrated circuit 502 for detecting a fault condition in accordance with the teachings of the present invention. In the illustrated example, integrated circuit 502 includes a power switch 512 and control circuitry similar to controller 138 or controller 202, described above. In one example, input voltage 102 is between 120 volts and 375 volts. In one example, output voltage 122 is approximately 5 volts. Integrated circuit 502 includes a drain terminal 506 coupled to one end of the primary winding 112, a source terminal 508 coupled to input return 142, a bypass terminal 510 coupled to a capacitor 514, and a feedback terminal 504 coupled to receive sense signal 150 from feedback circuit 121. As can be seen in FIG. 5, integrated circuit 502 senses output voltage and input line voltage via a single terminal (e.g., feedback terminal 504).

Figure 6:
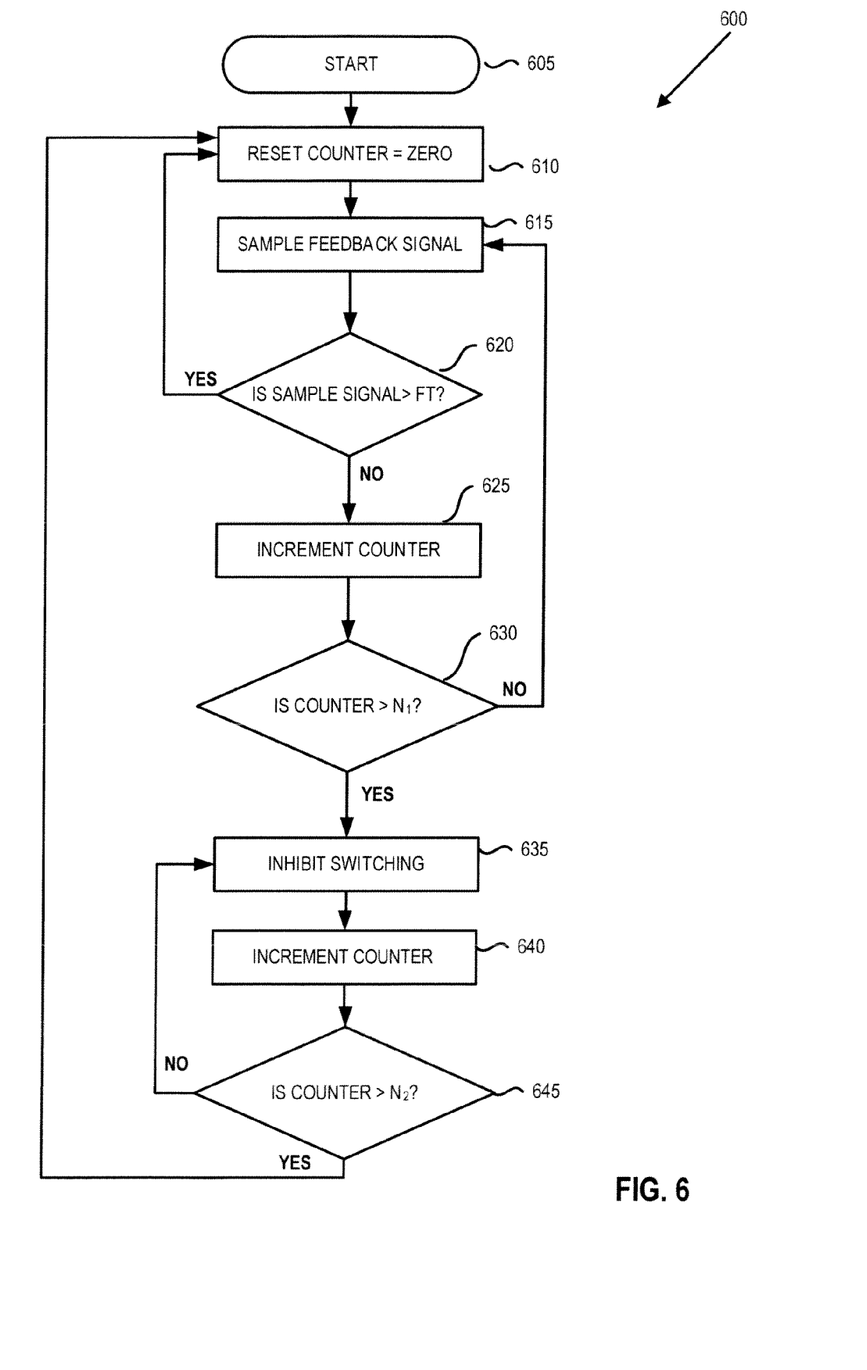
FIG. 6 is a flowchart illustrating an example method for detecting a fault condition in a power converter in accordance with the teachings of the present invention.

FIG. 6 is a flowchart illustrating an example method 600 for detecting a fault condition in a power converter in accordance with the teachings of the present invention. In the described method, the example power converter is similar to the power converters described above, in which there is switching of a power switch that is coupled to an energy transfer element coupled between the input and output of the power converter. In the example, the switching of the power switch is controlled with a controller coupled to the switch. A sensing signal is generated by a feedback circuit that is representative of a power converter output voltage during an OFF state of the power switch and representative of a power converter input voltage during an ON state of the power switch. The controller is responsive to the sensing signal and the controller is coupled to detect the presence of a fault condition in the feedback circuit and to inhibit the switching of the power switch in response to detecting the fault condition.

In particular, method 600 starts in a block 605. In a block 610, a counter (e.g., counter 406) is reset to zero. In a block 615, a sensor (e.g., sensor 204) samples a sensing signal (e.g., sensing signal 150). In one example, the sensor samples the sensing signal during an ON state of the power switch. In one example, the sensor samples the sensing signal during an OFF state of the power switch.

In a decision block 620 the sampled sensing signal is compared with a fault threshold (FT). In one example, sampled sensing signal is compared with the FT by a comparator such as comparator 402 of FIG. 4A. If the sampled sensing signal is greater than the FT then no fault condition is detected and method 600 returns to block 610 where the counter is reset. However, if the sampled sensing signal not greater than the FT then a fault condition is detected and the method continues to a block 625. In a block 625 the counter is incremented. As stated above, the counter may be incremented with each switching cycle of the power switch or may be incremented in response to a clock signal internal to the controller.

In a block 630, the counter is compared with the first number threshold N1. If the counter is not greater than the first number threshold, method 600 returns to block 615 to sample the sensing signal again. Method 600 will repeat blocks 615-630 until the counter is greater that the first number threshold or if the sampled sensing signal rises above the fault threshold FT.

In a block 635, the switching of the power switch is inhibited. In one example, a fault detector (e.g., fault detector 206) outputs an inhibit signal to a control (e.g., control 208) to indicate that a fault condition is present. In response to receiving the inhibit signal, control inhibits the switching of the power switch to reduce an output power level of the power converter.

In a block 640 the counter is again incremented and in a block 645 the counter is compared with a second number threshold N2. Method 600 repeats blocks 635-645, continuing to inhibit switching of the power switch, until the counter is greater than the second number threshold. Once the counter is greater than N2, method 600 returns to block 610 to reset the counter and engage normal switching of the power switch.

The order in which some or all of the process blocks appear in method 600 should not be deemed limiting. Rather, one of ordinary skill in the art having the benefit of the present disclosure will understand that some of the process blocks may be executed in a variety of orders not illustrated.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An integrated circuit controller for a power converter, the controller comprising:
    a control coupled to control switching of a power switch to regulate an output of the power converter;
    a sensor coupled to receive a signal from a terminal of the integrated circuit controller, the signal from the terminal to represent an input voltage of the power converter during at least a portion of an ON state of the power switch, the signal from the terminal to represent an output voltage of the power converter during at least a portion of an OFF state of the power switch, wherein the sensor is coupled to sample the signal from the terminal during the portion of the ON state of the power switch; and
    a fault detector coupled between the sensor and the control, wherein the fault detector is coupled to detect a fault condition of the power converter in response to the sampled signal, wherein the control is coupled to inhibit the switching of the power switch to reduce a power output level of the power converter in response to the fault detector detecting the fault condition.

2. The integrated circuit controller of claim 1, wherein the fault detector comprises a counter to determine an amount of time that the fault condition is detected and to output an inhibit signal to the control to reduce the power output level of the power converter if the determined amount of time is greater than or equal to a first threshold period of time.

3. The integrated circuit controller of claim 2, wherein the counter outputs the inhibit signal to the control to reduce the power output level of the power converter for a second threshold time period regardless of whether the fault condition remains.

4. The integrated circuit controller of claim 1, wherein the control inhibits the switching of the power switch to reduce the power output level of the power converter by limiting a drain current through the power switch when the power switch is in the ON state.

5. The integrated circuit controller of claim 1, wherein the sensor samples the signal from the terminal during the portion of the ON state of the power switch in response to a drive signal output from the control to the power switch.

6. The integrated circuit controller of claim 1, wherein the signal from the terminal comprises a first signal and a second signal, wherein the first signal is a current that is representative of the input voltage of the power converter during at least the portion of the ON state of the power switch, and wherein the second signal is a voltage that is representative of the output voltage of the power converter during at least the portion of the OFF state of the power switch.

7. The integrated circuit controller of claim 1, wherein the control is coupled to inhibit the switching of the power switch to reduce the power output level of the power converter by adjusting a duty cycle of a drive signal output from the control to the power switch.

8. The integrated circuit controller of claim 1, wherein in the power switch is coupled to an energy transfer element that includes an auxiliary winding to generate a reflected voltage that is substantially representative of the input voltage during at least the portion of the ON state of the power switch, wherein the sensing signal is generated in response to the reflected voltage.

9. The integrated circuit controller of claim 8, wherein the terminal is a feedback terminal, the integrated circuit controller further comprising a ground terminal, wherein the feedback circuit includes:
    a first resistor coupled between the auxiliary winding and the feedback terminal; and
    a second resistor coupled between the feedback terminal and the ground terminal, wherein a value of the output of the power converter that is regulated by the integrated circuit controller is responsive to a resistance value of the first resistor and a resistance value of the second resistor.

* * * * *